United States Patent
Hinrichs

(10) Patent No.: US 11,844,975 B2
(45) Date of Patent: *Dec. 19, 2023

(54) FIRE SUPPRESSANT

(71) Applicant: Green Canyon Ventures LLC, Miami, FL (US)

(72) Inventor: Rodolfo Hinrichs, Miami, FL (US)

(73) Assignee: Green Canyon Ventures LLC, Miami, FL (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/431,478

(22) PCT Filed: Aug. 13, 2020

(86) PCT No.: PCT/US2020/046099
§ 371 (c)(1),
(2) Date: Aug. 17, 2021

(87) PCT Pub. No.: WO2021/030544
PCT Pub. Date: Feb. 18, 2021

(65) Prior Publication Data
US 2022/0134157 A1    May 5, 2022

Related U.S. Application Data

(60) Provisional application No. 62/886,388, filed on Aug. 14, 2019.

(51) Int. Cl.
*A62D 1/00* (2006.01)

(52) U.S. Cl.
CPC ................ *A62D 1/0042* (2013.01)

(58) Field of Classification Search
CPC .......... A62D 1/0042; C05G 5/10; C05G 3/50; C05G 5/20; C05C 3/00; C08F 220/06
See application file for complete search history.

(56) References Cited

U.S. PATENT DOCUMENTS

| | | |
|---|---|---|
| 6,464,903 B1 | 10/2002 | Blount |
| 2009/0212251 A1 | 8/2009 | Stewart |
| 2010/0181084 A1* | 7/2010 | Carmo ................. A62D 1/0035 169/45 |
| 2014/0366598 A1* | 12/2014 | Carmo ................. A62D 1/0042 71/29 |

FOREIGN PATENT DOCUMENTS

| | | |
|---|---|---|
| BE | 721816 | 4/1969 |
| CN | 104802257 | 7/2015 |
| ES | 2330354 | 12/2009 |
| GB | 1243026 | 8/1971 |
| GB | 1286071 | 8/1972 |
| WO | WO2006052245 | 5/2006 |
| WO | WO2012164143 | 12/2012 |
| WO | WO2013053031 | 4/2013 |
| WO | WO2014177488 | 11/2014 |
| WO | WO2018122406 | 7/2018 |

* cited by examiner

*Primary Examiner* — Andrew J. Oyer
(74) *Attorney, Agent, or Firm* — Defillo & Associates, Inc.; Evelyn A. Defillo

(57) ABSTRACT

A fire suppressant including technical urea 10-30% (by weight), ammonium sulphate 20-50%, and sodium bentonite 12-26%. The fire suppressant further includes polypropylene glycol (polyglycol), alkyl sulfonic acid, castor oil, guar gum, and/or triethanolamine dodecylbenzene sulfonate. The fire suppressant does not pose any risk to plant or animal life since the product is completely benign and is classified as non-toxic. It does not cause any damage to aquifers or groundwater, and it biodegrades in 30 to 60 days.

3 Claims, No Drawings

FIRE SUPPRESSANT

CROSS REFERENCE TO RELATED APPLICATION

This application is a national stage entry of PCT/US2020/046099 filed Aug. 13, 2020, under the International Convention and claiming priority over U.S. Provisional Application No. 62/886,388 filed Aug. 14, 2019.

FIELD OF THE INVENTION

The purpose of the invention of this Fire Suppressant is to provide a tool that will suppress various types of fires and prevent their advance on different surfaces.

BACKGROUND OF THE INVENTION

From the beginning of humanity, fire has been one of the most important discoveries and a great benefit to humans. However, fire has also posed a great risk to humans when it gets out of control. The destructive nature of fire is a result of the massive oxidation of materials, brought about by a combination of three elements: a source of intense heat, a comburent (e.g. oxygen), and a combustible material.

In order to combat fires, many fire retardants have been developed over the years. Fire retardants act by attempting to displace oxygen from the area and protect combustible material by creating a physical and chemical barrier. These fire retardants attempt to slow the advance of a fire long enough to permit combat through other means in the hopes of controlling and eventually putting out the fire.

The applicant knows of the Fire Retardants disclosed in WO2014177488, ES2330354, BE721816, WO2006052245, U.S. Pat. No. 6,464,903, GB1286071 and US2009212251.

SUMMARY OF INVENTION

The Fire Suppressant of the present invention is a chemical compound made from several materials, combined to form a white granulated powder. The granulated powder can be dissolved very easily in any watery liquid. The primary components of the product are Technical Urea and/or Ammonium Sulphate, both of which are nitrogen compounds which are found in high concentrations in the product.

The Fire Suppressant breaks the chain of three basic elements necessary for the existence of fire in the three ways. First, it dramatically reduces the temperature in the application zone, lowering the temperature to levels at which fire cannot exist. Second, it displaces a significant amount of oxygen away from the area. And third, it protects the combustible material preventing its massive oxidation. In this way, it actually suppresses, rather than retards, fire.

The Fire Suppressant initially presents as a white substance. Once it is mixed with water, its appearance is milky.

The basic components are:
Technical Urea 10-30% (by weight)
Ammonium Sulphate 20-50%
Bentonite 12-26%
Castor Oil 0-7%
Polypropylene Glycol 0-10%
Alkyl Sulfonic Acid 0-3%
Guar Gum 0-7%
Triethanolamine Dodecylbenzene Sulphonate 0-3%
Linear Alkylbenzene Sulfonate 0-3%
Dolomitic Limestone 0-3%
Graphite Powder 0-4%
Potassium chloride 0-2%

Technical Urea and Ammonium Sulphate provide nitrogen and other gases that will cool the area when it comes into contact with the fire, and also displace the oxygen.

Bentonite increases the density of the product. It also It helps the application because of its lubricity. It protects the materials by absorbing heat. It prevents the other gases from being released until the extreme temperatures reach the application area. It also prevents the dispersion of hot ashes.

Castor oil: The purpose of this component is to protect the material from extreme heat. It also helps the product to adhere to the surface of the application area and keeps all the components of the formula together.

Polypropylene Glycol protects the material from extreme heat, and helps the product adhere to the surface of the application area and keeps all the components of the formula together.

Alkyl Sulfonic Acid, Linear Alkylbenzene Sulfonate, and Triethanolamine Dodecylbenzene Sulfonate as stabilizers.

Guar Gum increases the density of the product. This component is necessary when the Fire Suppressant is to be air-dropped to avoid atomization. The increased density also helps the product to penetrate effectively into the application area.

Dolomitic Limestone homogenizes the product, preventing clumping. It also helps the dilution.

Powder graphite: Its purpose is to make the product more adherent to the application area and to lubricate the product, helping the application with the different equipment.

Potassium chloride: It provides protection against weather conditions, giving the product a longer effective life until its biodegradation.

Its primary characteristics are:
Blocks and suppresses fire
Biodegradable
Non-toxic
Noncorrosive In addition, color or pigments may be added for commercial reasons depending on the type of product. For example, for forest fires, a red color is added to the product, generally iron oxide, so that application of the product is clearly identifiable from the air. For the rest of fires, the product generally retains its regular whitish shade. Additional color may be added as commercially required for various industries. The addition of color does not affect the product's qualities or effectiveness.

Although the Fire Suppressant is originally formulated as a granulated powder, it is may be commercially sold in a concentrated liquid version, which is made by combining the aforementioned powder with a small amount of water to create a concentrate which will later need to be diluted to 10% in additional water prior to its application. A foam version of the product will also be made commercially available, primarily for use in fuel fires.

The Fire Suppressant can be used on forest fires, structural fires, fires on ships and aircraft, and fuel fires.

DETAILED DESCRIPTION OF THE INVENTION

The primary characteristic of the Fire Suppressant is that the moment it comes into contact with the heat caused by a fire through radiation and convection, the combination of the Fire Suppressant with heat triggers a chemical reaction that causes the rapid emanation of intense cold, thereby breaking the fire cycle. This emanation of massive cold in the form of nitrogen (cold gas), not only dramatically lowers the temperature in the surrounding area, but also displaces a large portion of the available oxygen. This reaction is completely harmless to humans, since the air we breathe is comprised of 78% nitrogen, and there will always be some remaining oxygen in the affected area (allowing a firefighter or person trapped in the fire to breathe easily). When the flames and the surrounding heat come in contact with the Fire Suppressant, the massive emanation of nitrogen causes the temperature to go down to levels at which fire cannot exist, since ignition is not possible. Usually, at this point, the fire will slowly go out and will not reignite.

Forest fires generally reach an average temperature of 1789° F. (976° C.), but in the area to which the Fire Suppressant has been applied and the surrounding area, the temperature descends drastically to an average of 143° F. (62° C.), a temperature at which the presence of fire becomes impossible. At the same time, the presence of nitrogen in the area as a cold gas prevents the fire from spreading beyond the application zone in most cases. The product also prevents the reignition of the fire once it has been extinguished, since its effect on treated vegetation lasts for a minimum of 15-20 days, provided it does not rain. The Fire Suppressant lowers the ambient temperature, so it is earlier possible to walk after the fire.

The Fire Suppressant does not pose any risk to plant or animal life, since the product is completely benign and is classified as non-toxic. It does not cause any damage to aquifers and groundwater, and it biodegrades in 30 to 60 days. During this time, the Fire Suppressant continues to protect the application area from reignition, at least for 15-20 days.

Due to the fact it is not corrosive to metals or other materials, the Fire Suppressant can be used in backpack pumps, portable pumps, and sprinkler systems in homes or buildings, as well as applied from the air using airplanes or helicopters.

In structural fires, as well as fires on ships and aircraft, the massive cooling effect of the Fire Suppressant in the area of application when it comes into contact with fire can be highly beneficial to firefighting brigades. When a firefighter starts to apply the Fire Suppressant to the fire, it begins to give off massive cold, which lowers the high ambient temperature in the area, and allows them to advance into the affected area quickly and safely to directly combat the flames more effectively, which is generally not possible due to the radiated heat around the fire's center, which prevents access to it.

The use of the product in structures provides two primary benefits, which are greater speed in the extinction of the fire and less use of water, since water is only the medium used for applying the product. This translates into a reduction of approximately two thirds of the time it takes to extinguish a fire compared to water alone.

On ships and aircraft, the Fire Suppressant can also provide a great benefit due to its cooling properties. It allows for a fire to be extinguished more rapidly, in order to save the ship. In addition, the Fire Suppressant does not react negatively with petroleum-based or other fuel fires. Foam version works very well with this kind of fires.

Although the recommendation is for the product to be mixed with fresh water, it can also be mixed with sea water in the case of ships.

Due to the non-corrosive qualities, it can be applied on any metallic surface.

The Fire Suppressant is not recommended for use on electrical fires. Although the Fire Suppressant would be able to extinguish an electrical fire, the affected area, which conducts electricity, would be wet from the water the Fire Suppressant is diluted in, and there is a risk of electrocution to people in the area.

In forest fires, due to the expanse of land, an indirect attack is recommended, by applying the product safely ahead of the advance of a wildfire, to form a firewall that suppresses the fire once it reaches the application zone, and allows firefighters to safely and effectively follow up with a direct attack, if necessary. Safe application is a very important factor, since firefighters can combat the fire from a distance without risking human lives. The possibility of a direct attack is especially useful to defend a specific area or human lives. Due to the prolonged effectiveness after its application, a preventive attack is also possible where there is no fire yet, but there is a high risk of a fire, for example, along train tracks or especially sensitive forest areas.

The Fire Suppressant can be applied from land or air, as a firewall about 15-50 ft wide, depending on the topography of the terrain and the type of vegetation. Vegetation in the application zone must be treated completely, from the base to the crown.

The product is applied using existing equipment commonly used for firefighting.

For application from land, the equipment generally used are backpack pumps, portable pumps, or trucks fitted with tanks and pumps with hoses. The product is not meant to be applied with fumigation equipment, since the reduced size of the applicator opening would prevent all the particles of the product from passing through.

From the air, the Fire Suppressant can be applied from any type of airplane or helicopter that is generally used for firefighting, or from any other aircraft modified for this purpose. The discharge of the product is done in a continuous and overlapping manner until the firewall area is treated in advance of the fire. The aerial application technique is identical to that of existing fire retardants.

In the case of private individuals that may want to use the product to defend their property, it can be applied using a hose, home outdoor irrigation sprinkler system, or a dedicated sprinkler system used for fire protection. A tank would be added to the system with a Venturi injector mechanism that would dilute the concentrate to 10% prior to spraying. Other techniques would be used if the Fire Suppressant is in powder form.

For structural fires and fires on ships, the Fire Suppressant can be applied in one of two ways. First, through the existing sprinkler system, to which the product is added using a Venturi injector mechanism. Second, through direct combat at the source of the fire. Firefighters apply the product using hoses, backpack pumps, or other types of fire extinguisher sprayers directly on the fire. This will produce an almost instantaneous reaction by which the Fire Suppressant will begin giving off extreme cold in the application zone, which will in turn lower the ambient temperature and allow fire crews to more rapidly advance through the affected area.

In the case of fires on aircraft, the Fire Suppressant is applied using trucks fitted with pumps and hoses. Foam Fire Suppressant will usually be used in this kind of fires.

For fuel fires, use of the foam version of the Fire Suppressant is recommended.

The invention claimed is:
1. A fire suppressant consisting of:
technical urea 10-30% (by weight);
ammonium sulphate 20-50%; and
sodium bentonite 12-26%.

2. A fire suppressant consisting of:
technical urea 10-30% (by weight);
ammonium sulphate 20-50%;
sodium bentonite 12-16%; and
0 to 10% of polypropylene glycol (polyglycol).

3. A fire suppressant consisting of:
technical urea 10-30% (by weight);
ammonium sulphate 20-50%;
sodium bentonite 12-26%;
0 to 10% of polyproylene glycol (polyglycol);
0 to 3% of alkyl sulfonic acid;
0 to 7% of guar gum;
0 to 3% of linear alkylbenzene sulfonate;
0 to 3% of dolomitic limestone;
0 to 4% of graphite powder;
0 to 2% of potassium chloride;
optionally a pigment; and
optionally water.

\* \* \* \* \*